(12) United States Patent
Yamazaki

(10) Patent No.: US 12,209,339 B2
(45) Date of Patent: Jan. 28, 2025

(54) METHOD OF PRODUCING INORGANIC FIBER MAT AND INORGANIC FIBER MAT

(71) Applicant: IBIDEN CO., LTD., Ogaki (JP)

(72) Inventor: Tomohisa Yamazaki, Takahama (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 18/698,781

(22) PCT Filed: Dec. 6, 2023

(86) PCT No.: PCT/JP2023/043606
§ 371 (c)(1),
(2) Date: Apr. 5, 2024

(87) PCT Pub. No.: WO2024/122566
PCT Pub. Date: Jun. 13, 2024

(65) Prior Publication Data
US 2024/0328047 A1    Oct. 3, 2024

(30) Foreign Application Priority Data

Dec. 9, 2022 (JP) .................................. 2022-197138
Dec. 9, 2022 (JP) .................................. 2022-197139
(Continued)

(51) Int. Cl.
*D04H 1/70*    (2012.01)
*D04H 1/4209*  (2012.01)
(Continued)

(52) U.S. Cl.
CPC ............. *D04H 1/70* (2013.01); *D04H 1/4209* (2013.01); *D04H 1/46* (2013.01); *D21B 1/12* (2013.01);
(Continued)

(58) Field of Classification Search
CPC .......... D04H 1/70; D04H 1/4209; D04H 1/46; D21B 1/12; D21B 1/32; D21C 5/02; D21H 13/36; D10B 2101/02
See application file for complete search history.

(56) References Cited

U.S. PATENT DOCUMENTS 9,670,814 B2 * 6/2017 Sako ....................... C04B 35/14
2009/0257925 A1  10/2009 Sugino et al.
(Continued)

FOREIGN PATENT DOCUMENTS

CN    101560901    10/2009
CN    101581245    11/2009
(Continued)

OTHER PUBLICATIONS

International Search Report for corresponding International Application No. PCT/JP2023/043606, Feb. 27, 2024 (w/ machine translation).
(Continued)

*Primary Examiner* — Jacob T Minskey
*Assistant Examiner* — Stephen M Russell
(74) *Attorney, Agent, or Firm* — MORI & WARD, LLP

(57) ABSTRACT

Provided is a method of producing an inorganic fiber mat the method including: a preparing step of preparing a first inorganic fiber molding derived from a needle-punched mat and a second inorganic fiber molding derived from a paper-making mat; a defibrating step of defibrating the first inorganic fiber molding and the second inorganic fiber molding
(Continued)

to obtain defibrated inorganic fibers; and a papermaking step of forming the inorganic fiber mat by papermaking using a slurry containing the defibrated inorganic fibers.

11 Claims, 5 Drawing Sheets

(30) Foreign Application Priority Data

| | | |
|---|---|---|
| May 25, 2023 | (JP) | 2023-086216 |
| May 25, 2023 | (JP) | 2023-086217 |
| Sep. 15, 2023 | (JP) | 2023-150206 |

(51) Int. Cl.
*D04H 1/46* (2012.01)
*D21B 1/12* (2006.01)
*D21B 1/32* (2006.01)
*D21C 5/02* (2006.01)
*D21H 13/36* (2006.01)

(52) U.S. Cl.
CPC ............... *D21B 1/32* (2013.01); *D21C 5/02* (2013.01); *D21H 13/36* (2013.01); *D10B 2101/02* (2013.01)

(56) References Cited

U.S. PATENT DOCUMENTS

| | | |
|---|---|---|
| 2009/0285726 A1 | 11/2009 | Ohshika et al. |
| 2012/0110805 A1 | 5/2012 | Ohshika et al. |

FOREIGN PATENT DOCUMENTS

| | | |
|---|---|---|
| JP | 08-325908 | 12/1996 |
| JP | 09-210289 | 8/1997 |
| JP | 2001-335379 | 12/2001 |
| JP | 2008-266856 | 11/2008 |
| JP | 2010-209501 | 9/2010 |
| JP | 2014-150206 | 8/2014 |
| JP | 2014-190190 | 10/2014 |
| JP | 2015-081752 | 4/2015 |
| JP | 2016-011485 | 1/2016 |
| JP | 2016-089723 | 5/2016 |
| WO | WO 2017/195670 | 11/2017 |

OTHER PUBLICATIONS

Written Opinion for corresponding International Application No. PCT/JP2023/043606, Feb. 27, 2024 (w/ machine translation).

* cited by examiner

METHOD OF PRODUCING INORGANIC FIBER MAT AND INORGANIC FIBER MAT

TECHNICAL FIELD

The present invention relates to a method of producing an inorganic fiber mat and an inorganic fiber mat.

BACKGROUND ART

Various exhaust gas purification apparatuses that collect particulate matters (PM) in an exhaust gas or purify harmful gas components have been proposed. Such exhaust gas purification apparatuses include an exhaust gas treatment body including a porous ceramic material such as silicon carbide or cordierite, a casing for housing the exhaust gas treatment body, and an inorganic fiber mat material (a holding sealing material) arranged between the exhaust gas treatment body and the casing. The mat material is arranged mainly for, for example, preventing the exhaust gas treatment body from being damaged by contact with the casing that covers the outer periphery of the exhaust gas treatment body due to vibrations and impacts caused by the operation of automobiles or the like, and preventing exhaust gas leakage from a space between the exhaust gas treatment body and the casing.

Such an inorganic fiber mat material is prepared by punching or cutting a large inorganic fiber mat sheet into a predetermined shape. This causes the edges of the sheet to be offcuts. In response to recent demands for reduction of industrial waste, offcuts generated during production are required to be reused instead of being discarded.

Patent Literature 1 discloses a method of producing an insulating molding, the method including: defibrating a waste material of an inorganic fiber insulator; mixing the defibrated insulator with new inorganic fibers to prepare a cotton-like product; mixing the cotton-like product with a binder; and molding the mixture.

Patent Literature 2 discloses a method of producing a fiber molding, the method including: mixing ceramic fibers with ionic organic binder powder; adding water containing a heat resistant inorganic binder to the mixture and mixing them so that the mixture is almost wet as a whole; filling a mold with the wet mixture; and molding the wet mixture under pressure. In the method, part of the ceramic fibers is replaced by a finely crushed used fiber product.

CITATION LIST

Patent Literature

Patent Literature 1: JP H9-210289 A
Patent Literature 2: JP 2001-335379 A

SUMMARY OF INVENTION

Technical Problem

The methods disclosed in Patent Literatures 1 and 2 however have a problem in that the formability into the product is insufficient.

The present invention has been made in view of the above problem, and aims to provide a method of producing an inorganic fiber mat capable of more easily forming a mat even when an inorganic fiber molding is used as an inorganic fiber material.

Solution to Problem

The present inventors have conducted extensive studies and found that use of inorganic fibers derived from a needle-punched mat and inorganic fibers derived from a papermaking mat can facilitate the formability into a new inorganic fiber mat.

Specifically, a method of producing an inorganic fiber mat of the present invention (hereinafter also referred to as a production method of the present invention) includes a preparing step of preparing a first inorganic fiber molding derived from a needle-punched mat and a second inorganic fiber molding derived from a papermaking mat; a defibrating step of defibrating the first inorganic fiber molding and the second inorganic fiber molding to obtain defibrated inorganic fibers; and a papermaking step of forming the inorganic fiber mat by papermaking using a slurry containing the defibrated inorganic fibers.

The method of producing an inorganic fiber mat of the present invention having such features is excellent in formability into an inorganic fiber mat. Here, the phrase "excellent in formability" means that the density and thickness of the inorganic fiber mat can be easily controlled. Also, owing to the use of inorganic fibers derived from a needle-punched mat as inorganic fibers, the inorganic fibers are not excessively defibrated. Thus, an inorganic fiber mat having both resilience and wrapability can be produced.

Preferably, in the method of producing an inorganic fiber mat of the present invention, at least one of the first inorganic fiber molding or the second inorganic fiber molding is cut.

When the first inorganic fiber molding and/or the second inorganic fiber molding is cut into pieces, the pieces of the first inorganic fiber molding and/or the pieces of the second inorganic fiber molding have cut surfaces, and the inorganic fibers are easily defibrated in the cut surfaces. Thus, the inorganic fibers are not defibrated uniformly in the defibrating step. Thereby, an inorganic fiber mat having both resilience and wrapability can be produced. The pieces obtained by cutting the first inorganic fiber molding and the second inorganic fiber molding include products and offcuts described below.

Preferably, in the method of producing an inorganic fiber mat of the present invention, at least one of the first inorganic fiber molding or the second inorganic fiber molding includes offcuts of different shapes, and at least one of the offcuts has irregularities.

Use of offcuts as an inorganic fiber material enables the effective use of the offcuts instead of discarding thereof. Furthermore, owing to the offcuts of different shapes, with at least one of the offcuts having irregularities, the inorganic fibers are not defibrated uniformly in the defibrating step. Thus, an inorganic fiber mat having both resilience and wrapability can be produced.

Preferably, in the method of producing an inorganic fiber mat of the present invention, the first inorganic fiber molding and the second inorganic fiber molding are each an inorganic fiber molding sheet having an area of 1 $cm^2$ or more.

Owing to use of an inorganic fiber molding sheet having an area of 1 $cm^2$ or more as a material, the inorganic fibers are not defibrated uniformly. Thus, an inorganic fiber mat having both resilience and wrapability can be produced.

Preferably, in the method of producing an inorganic fiber mat of the present invention, the second inorganic fiber molding contains an inorganic binder.

The second inorganic fiber molding containing an inorganic binder can provide an inorganic fiber mat in which the inorganic binder is highly dispersed.

Preferably, an average fiber length of inorganic fibers constituting the needle-punched mat is longer than an average fiber length of inorganic fibers constituting the papermaking mat.

The first inorganic fiber molding derived from a needle-punched mat is not excessively defibrated compared to the second inorganic fiber molding derived from a papermaking mat. The average fiber length of the defibrated inorganic fibers derived from a papermaking mat is shorter than the average fiber length of the defibrated inorganic fibers derived from a needle-punched mat. Thus, an inorganic fiber mat having both resilience and wrapability can be produced.

Preferably, a proportion of the first inorganic fiber molding is 5 to 95% by weight based on a total weight of the first inorganic fiber molding and the second inorganic fiber molding. When the proportion of the first inorganic fiber molding falls within the above range, the production method of the present invention can provide an inorganic fiber mat having both higher resilience and higher wrapability.

Preferably, the defibrating step includes only wet defibration.

Defibration of inorganic fibers only by wet defibration can simplify the defibrating step.

Preferably, the needle-punched mat is formed by folding a thin layer sheet of an inorganic fiber precursor multiple times into a layered body with a predetermined width, and firing the layered body.

An offcut of such a needle-punched mat has a high proportion of inorganic fibers with long fiber lengths. When such an offcut is used as a material, the production method of the present invention can provide an inorganic fiber mat with a high surface pressure.

Preferably, the first inorganic fiber molding and the second inorganic fiber molding are each cut before the defibrating step.

When the inorganic fiber moldings are cut before the defibrating step, the defibrating step can proceed smoothly.

In the method of producing an inorganic fiber mat of the present invention, the slurry may further contain new inorganic fibers. When the slurry contains new inorganic fibers, preferably, the new inorganic fibers and the defibrated inorganic fibers have the same composition and are alumina-silica fibers containing 60 to 80% by weight of $Al_2O_3$.

When new inorganic fibers are added to the slurry, the production method of the present invention can provide an inorganic fiber mat having desired properties. When the new inorganic fibers and the defibrated inorganic fibers have the same composition, they have the same thermal expansion coefficient. Thus, the surface pressure of the inorganic fiber mat can be maintained without shifting the adhesion between the fibers when the inorganic fiber mat is used at high temperature. Furthermore, the inorganic fibers containing 60 to 80% by weight of $Al_2O_3$ can provide an inorganic fiber mat having high resilience and high heat resistance.

An inorganic fiber mat of the present invention is produced by the method of producing an inorganic fiber mat of the present invention.

The inorganic fiber mat of the present invention is formed by papermaking using the slurry containing inorganic fibers obtained by defibrating the first inorganic fiber molding derived from the needle-punched mat and the second inorganic fiber molding derived from the papermaking mat. The density and thickness of the inorganic fiber mat can be easily controlled, and the inorganic fiber mat has both resilience and wrapability.

DESCRIPTION OF EMBODIMENTS

Figure 1:
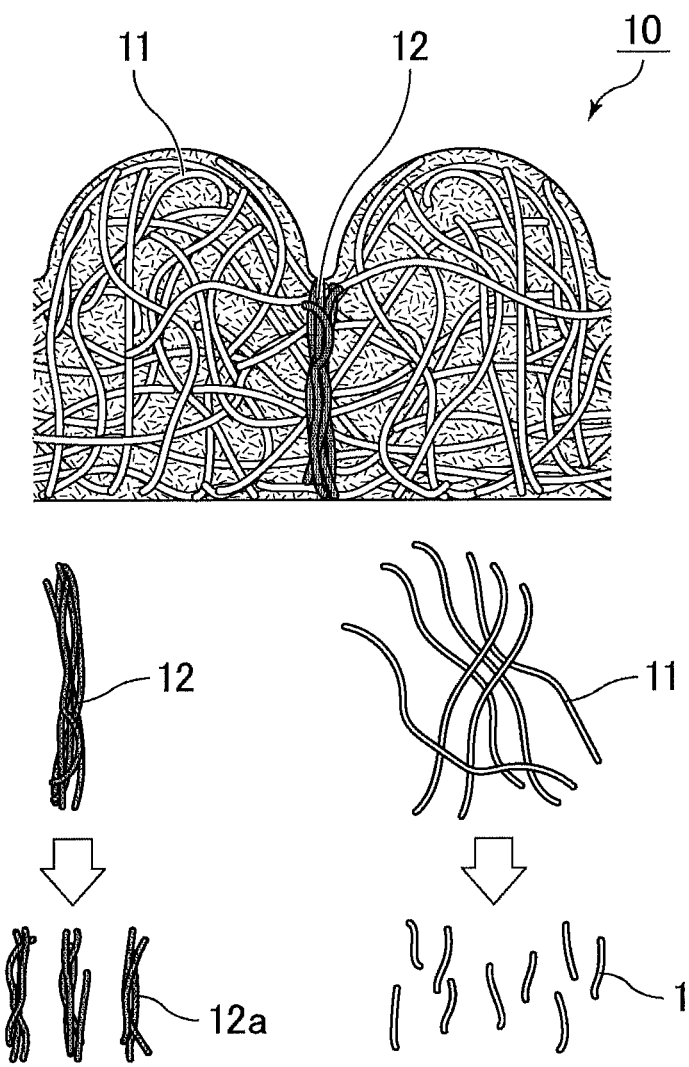
FIG. 1 shows a schematic diagram illustrating defibration of a first inorganic fiber molding derived from a needle-punched mat.

The following describes embodiments of the present invention. The present invention is not limited to the embodiments described below, and suitable modifications may be made without departing from the gist of the present invention.

In the method of producing an inorganic fiber mat of the present invention, a first inorganic fiber molding derived from a needle-punched mat and a second inorganic fiber molding derived from a papermaking mat are used as materials.

The first inorganic fiber molding is derived from a needle-punched mat. A needle-punched mat is produced by needling a mat containing inorganic fibers. The needling refers to a treatment in which a fiber entangling means such as a needle is inserted into and pulling out from a mat containing inorganic fibers. The needle-punched mat used as the first inorganic fiber molding includes multiple intertwined portions formed by needling on at least one of the front surface or the back surface.

Preferably, an average fiber length of inorganic fibers constituting the needle-punched mat is longer than an average fiber length of inorganic fibers constituting the papermaking mat.

As described below, the first inorganic fiber molding derived from a needle-punched mat is not excessively defibrated compared to the second inorganic fiber molding derived from a papermaking mat, and the average fiber length of the defibrated inorganic fibers derived from a papermaking mat is shorter than the average fiber length of the defibrated inorganic fibers derived from a needle-punched mat. Thus, an inorganic fiber mat having both resilience and wrapability can be produced.

The average fiber length of the inorganic fibers constituting the needle-punched mat is not limited, but the inorganic fibers need to have a certain length for forming an intertwined structure. The average fiber length of the inorganic fibers constituting the needle-punched mat is preferably 3.0 to 100 mm, more preferably 10.0 to 100 mm. The average fiber size (diameter) of the inorganic fibers constituting the needle-punched mat is preferably 2 to 10 µm, more preferably 3 to 7 µm.

Herein, the average fiber length and average fiber diameter of inorganic fibers are determined by observing randomly selected 100 inorganic fibers of an inorganic fiber mat in the field of a scanning electron microscope (SEM).

The second inorganic fiber molding is derived from a papermaking mat. A papermaking mat is produced by subjecting a mat containing inorganic fibers to papermaking treatment. The papermaking treatment herein refers to a treatment in which inorganic fibers are defibrated, a slurry of the defibrated fibers is prepared, and the fibers are formed into a mat.

The average fiber length of the inorganic fibers constituting the papermaking mat is preferably about 0.01 to 5.0 mm. A preferred average fiber size (diameter) of the inorganic fibers constituting the papermaking mat is the same as that of the inorganic fibers constituting the needle-punched mat.

Preferably, in the method of producing an inorganic fiber mat of the present invention, the average fiber length of the inorganic fibers constituting the needle-punched mat is 10.0 to 100 mm, and the average fiber length of the inorganic fibers constituting the papermaking mat is 0.01 mm to 5.0 mm.

When the average fiber length of the inorganic fibers constituting the needle-punched mat and the average fiber length of the inorganic fibers constituting the papermaking mat fall within the above ranges, the production method of the present invention can provide an inorganic fiber mat having both higher resilience and higher wrapability.

The inorganic fibers constituting the first inorganic fiber molding and the inorganic fibers constituting the second inorganic fiber molding are not limited. Desirably, the inorganic fibers include at least one selected from the group consisting of alumina fibers, silica fibers, alumina-silica fibers, mullite fibers, biosoluble fibers, and glass fibers.

When the inorganic fibers include at least one selected from the group consisting of alumina fibers, silica fibers, alumina-silica fibers, and mullite fibers, which have excellent heat resistance, the inorganic fiber mat does not undergo deterioration or the like even when it is exposed to high temperature, and can provide a mat material sufficiently having its function. When the inorganic fibers are biosoluble fibers, they do not damage the health of workers even if the workers inhale scattered inorganic fibers during production of an exhaust gas purification apparatus using a produced inorganic fiber mat. This is because the biosoluble fibers are dissolved in the body.

The alumina fibers may contain additives such as calcia, magnesia, and zirconia, in addition to alumina.

The $Al_2O_3/SiO_2$ compositional ratio by weight in alumina-silica fibers is preferably $Al_2O_3:SiO_2=60:40$ to $80:20$, more preferably $Al_2O_3:SiO_2=70:30$ to $74:26$.

Examples of the alumina-silica fibers include those containing 60 to 80% by weight of $Al_2O_3$.

The inorganic fibers of the first inorganic fiber molding and the inorganic fibers of the second inorganic fiber molding may have the same composition or different compositions.

The following describes the difference in formability in the production method of the present invention between the case where only the inorganic fiber molding derived from a needle-punched mat is used as a raw material and the case where only the inorganic fiber molding derived from a papermaking mat is used as a raw material, with reference to FIGS. 1, 2, 3A, 3B, and 3C.

In inorganic fiber materials derived from a papermaking mat, inorganic fibers generally have a short average fiber length and a high bulk density in water. Thus, a thick inorganic fiber mat is hardly prepared by a papermaking technique using the inorganic fiber materials, and the density and thickness of the inorganic fiber mat are difficult to control.

Since a needle-punched mat has a structure in which inorganic fibers are intertwined, unlike a papermaking mat, the inorganic fibers are not defibrated uniformly.

Figure 2:
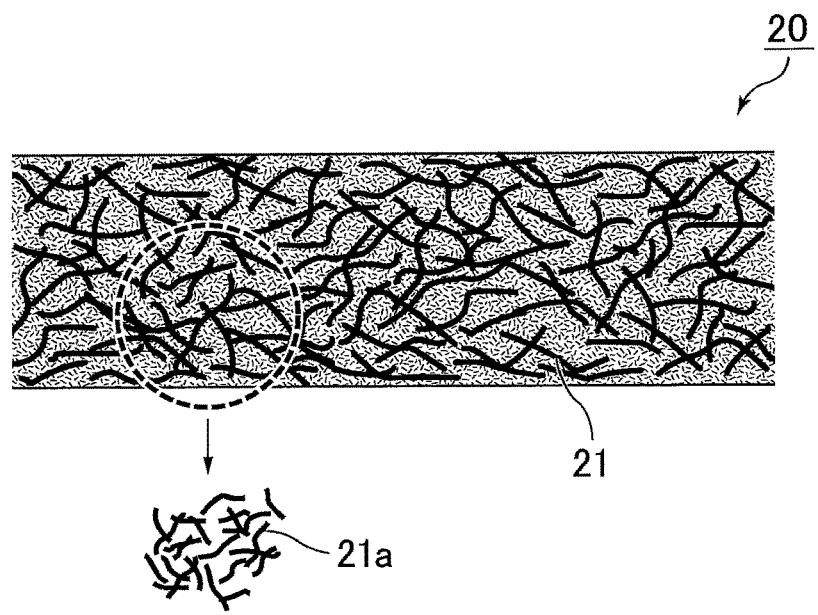
FIG. 2 shows a schematic diagram illustrating defibration of a second inorganic fiber molding derived from a papermaking mat.

FIG. 1 shows a schematic diagram illustrating defibration of a first inorganic fiber molding derived from a needle-punched mat. FIG. 2 shows a schematic diagram illustrating defibration of a second inorganic fiber molding derived from a papermaking mat. As shown in FIGS. 1 and 2, inorganic fibers 11 derived from a needle-punched mat constituting a first inorganic fiber molding 10 derived from a needle-punched mat and inorganic fibers 21 derived from a papermaking mat constituting a second inorganic fiber molding 20 derived from a papermaking mat are both defibrated into short fibers. Thus, short inorganic fibers 11a derived from a needle-punched mat, short inorganic fibers 12a derived from intertwined portions of the needle-punched mat, and short inorganic fibers 21a derived from a papermaking mat are obtained.

As shown in FIG. 1, in the needle-punched mat, the degree of intertwinement of inorganic fibers is completely different between the needle punched portions (also referred to as needle punch marks or intertwined portions) and other portions. The inorganic fibers 12 in intertwined portions are present in the form of fiber bundles and are thus difficult to be defibrated even when the fibers are subjected to defibration. Thus, the inorganic fibers (shorts inorganic fibers derived from intertwined portions of the needle-punched mat) 12a are less likely to have a short average fiber length compared to the case of the second inorganic fiber molding 20 derived from a papermaking mat. The inorganic fibers in a needle-punched mat and the inorganic fibers in a papermaking mat may have the same average fiber length in some cases. Yet, a needle-punched mat is often made of relatively long inorganic fibers and has multiple intertwined portions, and fiber bundles remain after defibration unlike a papermaking mat. Thus, the average fiber length of the defibrated inorganic fibers 11a and the average fiber length of the defibrated inorganic fibers 12a (short inorganic fibers derived from the needle-punched mat and short inorganic fibers derived from intertwined portions of the needle-punched mat) tend to be long.

Figure 3A:
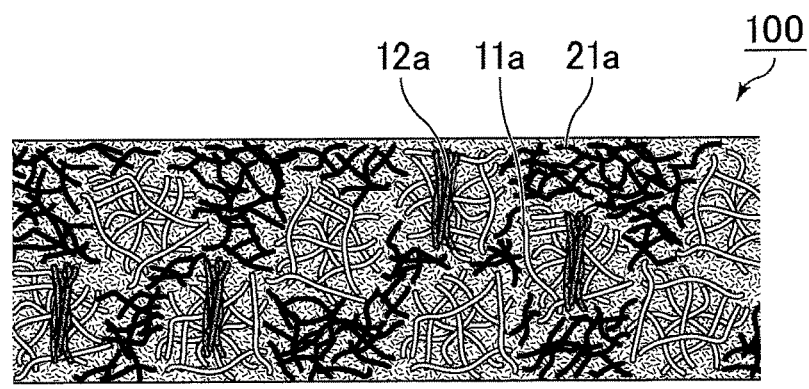
FIG. 3A shows a schematic cross-sectional view of a structure of an inorganic fiber mat produced by a production method of the present invention.
Figure 3B:
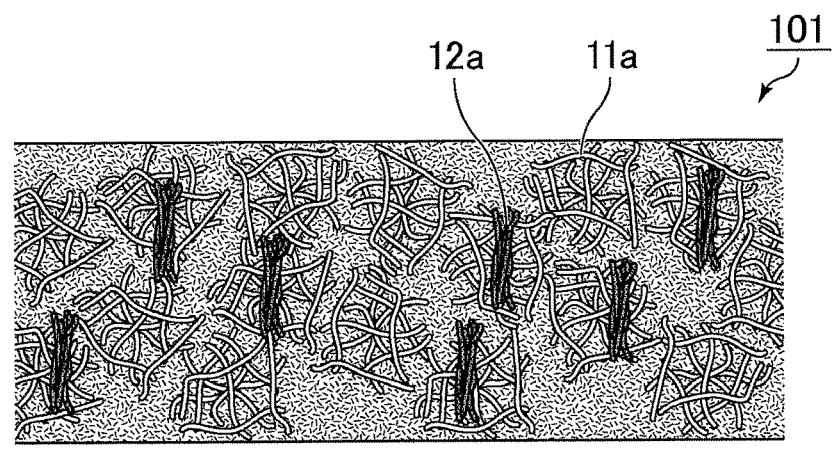
FIG. 3B shows a schematic cross-sectional view of a structure of an inorganic fiber mat produced from the first inorganic fiber molding.
Figure 3C:
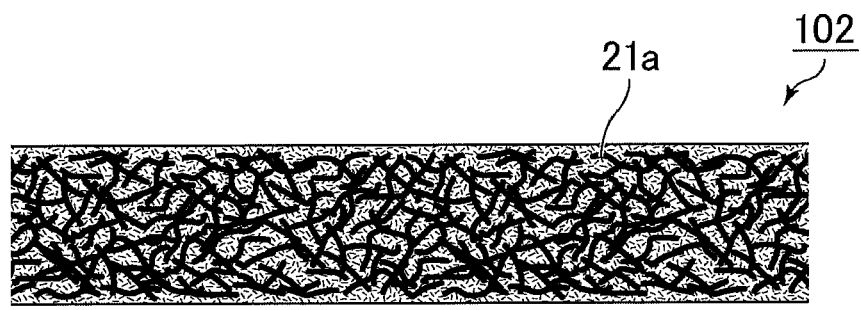
FIG. 3C shows a schematic cross-sectional view of a structure of an inorganic fiber mat produced from the second inorganic fiber molding.

FIGS. 3A, 3B, and 3C each show a step of papermaking defibrated inorganic fibers. FIG. 3A shows a schematic cross-sectional view of a structure of an inorganic fiber mat produced by a production method of the present invention. FIG. 3B shows a schematic cross-sectional view of a structure of an inorganic fiber mat produced from the first inorganic fiber molding. FIG. 3C shows a schematic cross-sectional view of a structure of an inorganic fiber mat produced from the second inorganic fiber molding.

To make these inorganic fiber mats usable, the inorganic fibers are required to be uniformly distributed. As shown in FIG. 3B, when only the inorganic fibers 11a and 12a derived from a needle-punched mat are used, the presence of fiber bundles and the long average fiber length of the inorganic fibers make it difficult to produce a thin inorganic fiber mat 101.

In the papermaking step in the production method of the present invention, as shown in FIG. 3A, the papermaking step is performed using a slurry containing the inorganic fibers 11a and 12a derived from a needle-punched mat and the inorganic fibers 21a derived from a papermaking mat. As described later, a raw material sheet prepared by papermaking is usually pressed so that the thickness thereof is adjusted to about 0.3 to 0.5 times the original thickness. Compared to a raw material sheet formed from only the short inorganic fibers 21a derived from a papermaking mat, a raw material sheet formed from only the inorganic fibers 11a and 12a derived from a needle-punched mat has an uneven distribution of inorganic fibers and is bulky. Thus, the thickness and density of the raw material sheet formed from only the inorganic fibers 11a and 12a are difficult to control by pressing. Also, the unevenness of the distribution of inorganic fibers is difficult to eliminate by pressing. For this reason, it is important to obtain a raw material sheet with uniform distribution of inorganic fibers during papermaking.

When a material containing inorganic fibers of various fiber lengths and fiber bundles is subjected to papermaking, the material is uniformly distributed, so that the fiber bundles and inorganic fibers of different fiber lengths become intertwined with each other. When the inorganic fibers 21a derived from a papermaking mat are present in addition to the inorganic fibers 11a and 12a derived from a needle-punched mat, the short inorganic fibers 21a derived from a papermaking mat enter gaps between the inorganic fibers 11a and 12a derived from a needle-punched mat. As a result, compared to an inorganic fiber mat produced using only the inorganic fibers 11a and 12a derived from a needle-punched mat, an inorganic fiber mat 100 having the same fiber surface specific gravity can have a smaller thickness.

As shown in FIG. 3B, the thickness of an inorganic fiber mat 101 formed from only the inorganic fibers 11a and 12a derived from a needle-punched mat is difficult to be small. Also, as shown in FIG. 3C, the thickness of an inorganic fiber mat 102 formed from only the inorganic fibers 21a derived from a papermaking mat is difficult to be large.

An inorganic fiber mat having an appropriate thickness can be produced by papermaking using a slurry containing inorganic fibers derived from a needle-punched mat and inorganic fibers derived from a papermaking mat as in the production method of the present invention. Specifically, the thickness of the mat can be controlled to be smaller than the thickness of an inorganic fiber mat derived only from a needle-punched mat and to be larger than the thickness of an inorganic fiber mat derived only from a papermaking mat. Thus, the production method of the present invention is excellent in formability into an inorganic fiber mat.

Preferably, the second inorganic fiber molding contains an inorganic binder. When the second inorganic fiber molding contains an inorganic binder, the method of the present invention can provide a new inorganic fiber mat in which the inorganic binder is highly dispersed.

The first inorganic fiber molding may or may not contain an inorganic binder. Preferably, the first inorganic fiber molding and the second inorganic fiber molding each contain an inorganic binder.

The inorganic binder may be any suitable hard ceramic material such as at least one of alumina, silica, silicon carbide, zirconia, boron nitride, diamond, or pumice, or a combination thereof. Preferred are alumina sol and silica sol.

The first inorganic fiber molding and the second inorganic fiber molding may each contain an organic binder. In this case, preferably, before the defibrating step described below, the first inorganic fiber molding and the second inorganic fiber molding are fired to decompose and remove the organic binder.

The first inorganic fiber molding and the second inorganic fiber molding in the present invention may be an inorganic fiber molding as it is without cutting. Preferably, at least one of the first inorganic fiber molding or the second inorganic fiber molding is cut. When the first inorganic fiber molding and/or the second inorganic fiber molding is cut into pieces, the pieces of the first inorganic fiber molding and/or the pieces of the second inorganic fiber molding have cut surfaces, and the inorganic fibers are easily defibrated in the cut surfaces. Thus, the inorganic fibers are not defibrated uniformly in the defibrating step. Thus, an inorganic fiber mat having both resilience and wrapability can be produced. The first inorganic fiber molding and the second inorganic fiber molding in the present invention may both be cut. The pieces obtained by cutting the first inorganic fiber molding and the second inorganic fiber molding include products and offcuts described below.

The first inorganic fiber molding and the second inorganic fiber molding are preferably cut by punching or cutting. Punching is a method in which a material to be processed is sandwiched between a cutting die and a plate, and the cutting die is pressed from above to cut the material into a desired shape. Cutting is a method of cutting a material with a cutting blade. In punching, a material is always cut along the shape of a cutting die. On the other hand, in cutting, the cutting shape is not limited, unlike punching.

Preferably, in the method of producing an inorganic fiber mat of the present invention, the first inorganic fiber molding and the second inorganic fiber molding as materials include two or more inorganic fiber moldings of different shapes. Here, the inorganic fiber moldings of different shapes refer to inorganic fiber moldings different in at least profile or size. The phrase "different in profile or size" does not include a difference in dimension of several percent. Shapes having the same profile but having different sizes are regarded as different shapes.

When two or more inorganic fiber moldings of different shapes are used, the inorganic fibers do not defibrate uniformly in the defibrating step, providing inorganic fiber materials of various fiber lengths and various shapes. Thus, the density and thickness of an inorganic fiber mat to be produced can be easily adjusted, and an inorganic fiber mat having both resilience and wrapability can be produced. Non-limiting examples of the shapes of the inorganic fiber moldings include sheet, string, spherical, and lump shapes. When the inorganic fiber moldings each have a sheet shape, the sheet shape is square, rectangular, circular, or elliptical, for example.

Preferably, at least one of the first inorganic fiber molding or the second inorganic fiber molding includes offcuts of different shapes, and at least one of the offcuts has irregularities. Offcuts refer to the remaining pieces of a material from which the necessary parts have been removed. A holding sealing material or the like for an exhaust gas purification apparatus is prepared by punching or cutting a large inorganic fiber mat sheet into a predetermined shape. This causes the edges of the sheet to be offcuts. Use of such offcuts as an inorganic fiber material is preferred in that the offcuts can be effectively used instead of being discarded.

Figure 4:
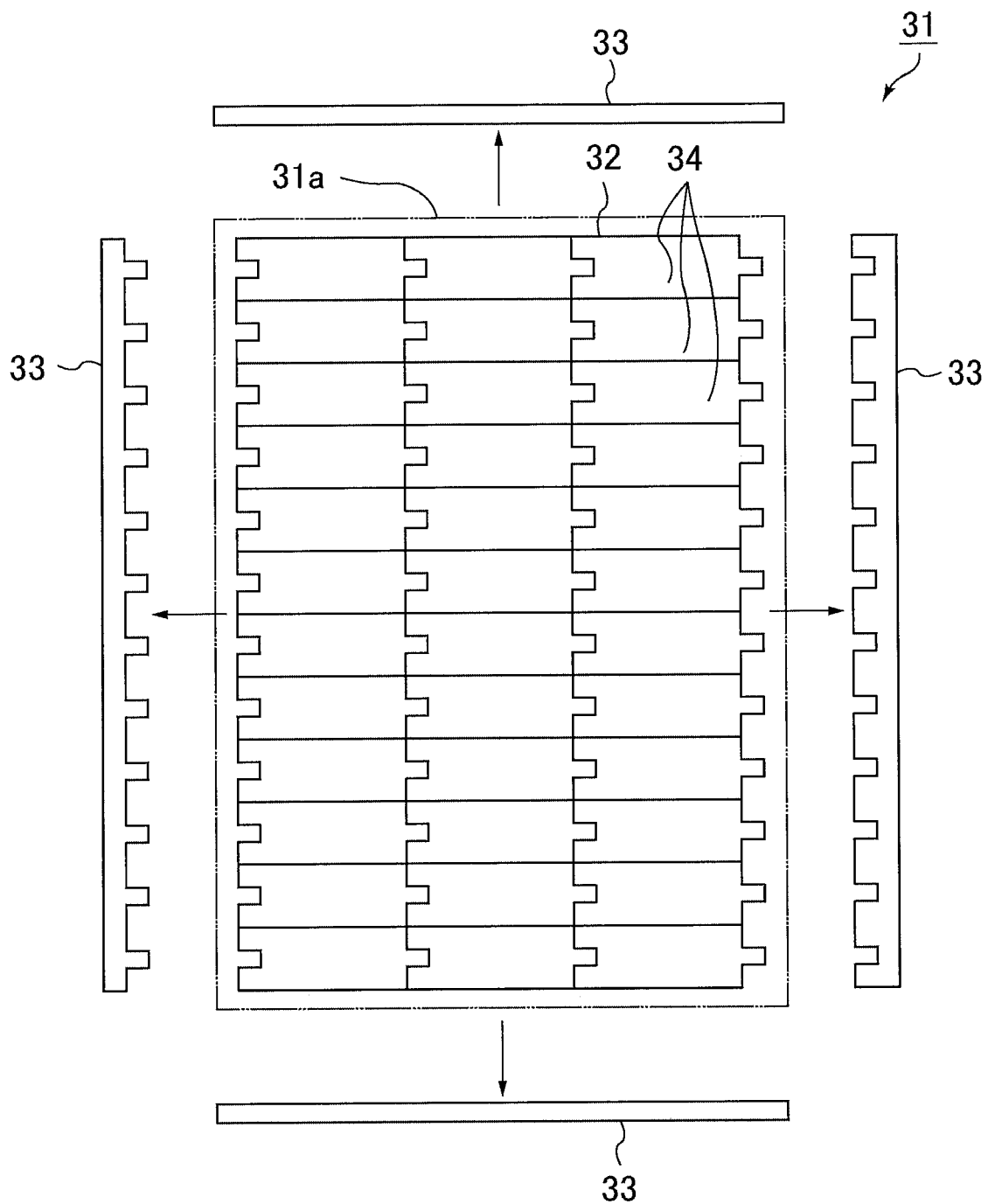
FIG. 4 shows a plan view including holding sealing materials for an exhaust gas purification apparatus and offcuts cut from an inorganic fiber mat material.

FIG. 4 shows a plan view including holding sealing materials for an exhaust gas purification apparatus and offcuts cut from an inorganic fiber mat material. In a production site of holding sealing materials, multiple holding sealing materials are cut out from a single large inorganic fiber mat material. First, as shown in FIG. 4, an inorganic fiber mat material 31 is divided into a holding sealing material forming portion 32 and offcuts 33. The inorganic fiber mat material 31 before cutting is outlined by an outer edge 31a of the inorganic fiber mat material. Next, the holding sealing material forming portion 32 is divided into individual holding sealing materials 34.

The pattern of cutting of the holding sealing material forming portion 32 is designed so as to increase the number of linear portions for efficient cutting and reduce the offcuts 33 as much as possible. When the holding sealing materials 34 have irregularities, each offcut 33 may have irregularities.

More preferably, in the production method of the present invention, such offcuts of different shapes, with at least one of the offcuts having irregularities, are used as inorganic fiber materials. Use of such offcuts of different shapes, with at least one of the offcuts having irregularities, prevents uniform defibration of the inorganic fibers in the defibrating step. Thus, an inorganic fiber mat having both resilience and wrapability can be produced.

When the holding sealing material forming portion 32 is cut out from the center portion of the inorganic fiber mat material 31, an offcut 33 having a frame shape is obtained. The offcut 33 having a frame shape may be used as it is in the production method of the present invention. The offcut 33 may be cut in the vertical direction and the horizontal direction to obtain offcuts 33 of various shapes.

Preferably, the first inorganic fiber molding and the second inorganic fiber molding are each an inorganic fiber molding sheet having an area of 1 cm² or more, more preferably an inorganic fiber molding sheet having an area of 10 cm² or more. The upper limit of the size of the first inorganic fiber molding and the upper limit of the size of the second inorganic fiber molding are not limited. For example, when the first inorganic fiber molding and the second inorganic fiber molding are each a sheet, the area is preferably 130 cm² or less. Use of an inorganic fiber molding sheet having an area of 1 cm² or more as a material prevents uniform defibration of the inorganic fibers. Thus, an inorganic fiber mat having both resilience and wrapability can be produced.

Figure 5A:
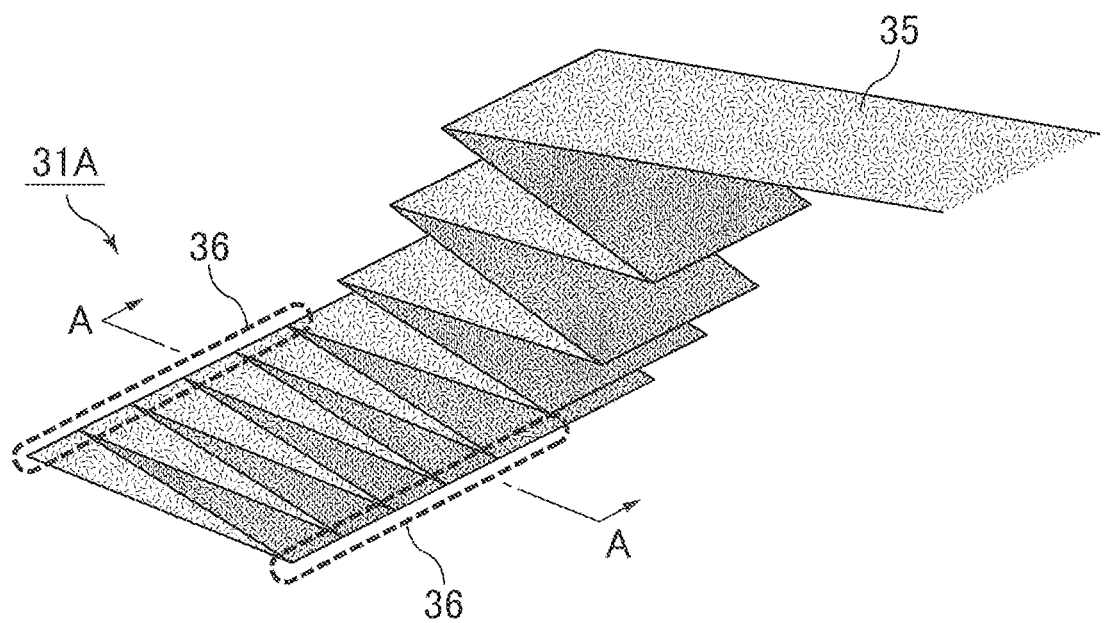
FIG. 5A shows a schematic diagram of a production example of a needle-punched mat folded into a layered body.
Figure 5B:
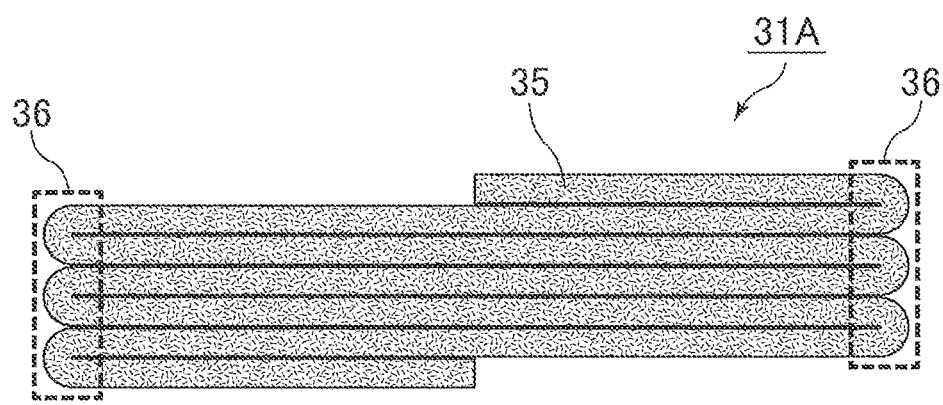
FIG. 5B shows a cross-sectional view of the needle-punched mat folded into a layered body produced as shown in FIG. 5A, taken along the line A-A.

Preferably, in the production method of the present invention, the needle-punched mat is formed by folding a thin layer sheet of an inorganic fiber precursor multiple times into a layered body with a predetermined width, and firing the layered body. Such a needle-punched mat is also referred to as a needle-punched mat folded into a layered body. FIG. 5A shows a schematic diagram of a production example of a needle-punched mat folded into a layered body. FIG. 5B shows a cross-sectional view of the needle-punched mat folded into a layered body produced as shown in FIG. 5A, taken along the line A-A. As shown in FIGS. 5A and 5B, a needle-punched mat 31A before firing is formed by folding a thin layer sheet 35 of an inorganic fiber precursor multiple times into a layered body with a predetermined width. As shown in FIG. 5A, the thin layer sheet 35 of the inorganic fiber precursor is folded while the sheet is continuously shifted in the direction perpendicular to the direction of folding. The width of each fold and number of folds may be, but not limited to, 1000 mm or more and five times or more, respectively, for example. In the needle-punched mat 31A before firing, folded portions 36 have a high proportion of long inorganic fibers.

When offcuts including such folded portions are used as inorganic fiber materials, the production method of the present invention can provide an inorganic fiber mat with a high surface pressure.

The needle-punched mat folded into a layered body can be produced, for example, by the method described in JP 2008-7933 A.

The proportions of the first inorganic fiber molding and the second inorganic fiber molding used are not limited. Since the inorganic fiber mat obtained by the production method of the present invention has both resilience and wrapability, the proportion of the first inorganic fiber molding to the total weight of the first inorganic fiber molding and the second inorganic fiber molding is preferably 5 to 95% by weight. When the proportion of the first inorganic fiber molding falls within the above range, the production method of the present invention can provide an inorganic fiber mat having both higher resilience and higher wrapability. The proportion of the first inorganic fiber molding is more preferably 50 to 90% by weight.

The method of producing an inorganic fiber mat of the present invention includes: a defibrating step of defibrating the first inorganic fiber molding and the second inorganic fiber molding to obtain defibrated inorganic fibers; and a papermaking step of forming the inorganic fiber mat by papermaking using a slurry containing the defibrated inorganic fibers.

As described above, when the first inorganic fiber molding and the second inorganic fiber molding contain an organic binder, the first inorganic fiber molding and the second inorganic fiber molding are preferably fired in a firing step before the defibrating step. The firing is performed, for example, at 700° C. to 1000° C. for one to eight hours. The firing temperature is preferably 800° C. to 950° C.

The defibration in the defibrating step can be performed by a single treatment of wet defibration only, or by a two-step treatment including dry defibration and wet defibration. In the production method of the present invention, to simplify the defibrating step, the defibrating step is preferably performed only by wet defibration.

The wet defibration can be performed using a wet defibrating apparatus such as a pulper or a mixer. The wet defibration can be performed by putting the first inorganic fiber molding and the second inorganic fiber molding into a wet defibrating apparatus containing water and stirring the contents. The first inorganic fiber molding and the second inorganic fiber molding are added in any order. Preferably, the first inorganic fiber molding is first put into water, followed by stirring, and then the second inorganic fiber molding is put thereinto, followed by stirring, or the first inorganic fiber molding and the second inorganic fiber molding are simultaneously put into water, followed by stirring. More preferably, in the production method of the present invention, to fully defibrate the first inorganic fiber molding, the first inorganic fiber molding is first put into water, followed by stirring, and then the second inorganic fiber molding is put thereinto, followed by further stirring.

When the dry defibration is performed, it is performed before wet defibration. The dry defibration may be performed using an apparatus such as a feather mill.

Before the defibrating step, the first inorganic fiber molding and the second inorganic fiber molding may each be cut into pieces each having desired dimensions in advance. When each inorganic fiber molding is cut before the defibrating step, the defibrating step can proceed smoothly. When offcuts are used as the first inorganic fiber molding and the second inorganic fiber molding, each offcut may be used as it is without cutting before the defibrating step.

Here, the average fiber length of the inorganic fibers to be obtained can be adjusted by changing the treatment conditions of wet defibration and dry defibration (e.g., stirring speed, stirring time). Examples of the treatment conditions for wet defibration include a stirring speed of 500 to 1000 rpm and a stirring time of 200 to 900 seconds. Preferably, the stirring speed is 650 to 850 rpm and the stirring time is 500 to 700 seconds, and more preferably, the stirring speed is 700 to 800 rpm and the stirring time is 500 to 650 seconds.

Through such a defibrating step, inorganic fibers having a desired fiber length distribution can be obtained. Whether the inorganic fibers have a desired fiber length distribution can be confirmed by determining the bulk density.

Next, a papermaking step of forming an inorganic fiber mat by papermaking is performed using a slurry containing the defibrated inorganic fibers.

The slurry can be prepared, for example, as follows.

First, a liquid containing water and defibrated inorganic fibers is prepared so that the concentration of inorganic fibers is about 0.5 to 2.0% by weight. When additional water or additional defibrated inorganic fibers are added to the liquid during slurry preparation, they are stirred with a stirrer for about 20 to 120 seconds. Next, an organic binder is added to the liquid in an amount of about 0.5 to 10% by weight relative to the weight of the inorganic fibers, and the contents are stirred for about one to five minutes. Further, an inorganic binder is added to the liquid in an amount of about 0.5 to 3% by weight relative to the weight of the inorganic fibers, and the contents are stirred for about one to five minutes. Further, a flocculant is added to the liquid in an amount of about 0.01 to 1.0% by weight relative to the weight of the inorganic fibers, and the contents are stirred for about two minutes at most to prepare a slurry.

The slurry may further contain new inorganic fibers. By adding new inorganic fibers to the slurry, the production method of the present invention can provide an inorganic fiber mat having desired properties. Here, the "new inorganic fibers" refer to fibers that have been formed for the first time as inorganic fibers and have never been used as a product.

The average fiber length of new inorganic fibers can be adjusted depending on target properties, and is preferably about 0.01 mm to 100 mm. A preferred average fiber size (diameter) of the new inorganic fibers is the same as that of the inorganic fibers constituting the needle-punched mat or that of the inorganic fibers constituting the papermaking mat.

The composition of the new inorganic fibers may be the same as those exemplified as the inorganic fibers constituting the first inorganic fiber molding and the inorganic fibers constituting the second inorganic fiber molding. Preferably, the composition of the new inorganic fibers is the same as the composition of the inorganic fibers constituting the first inorganic fiber molding and the composition of the inorganic fibers constituting the second inorganic fiber molding. When these inorganic fibers have the same composition, they have the same thermal expansion coefficient. Thus, the surface pressure can be maintained without shifting the adhesion between the fibers during high temperature use.

More preferably, the new inorganic fibers, the inorganic fibers constituting the first inorganic fiber molding, and the inorganic fibers constituting the second inorganic fiber molding are alumina-silica fibers containing 60 to 80% by weight of $Al_2O_3$. This is because such inorganic fibers can provide an inorganic fiber mat having improved resilience and improved heat resistance.

The inorganic binder to be added during slurry preparation may be the same as the inorganic binder contained in the first inorganic fiber molding and the second inorganic fiber molding. The organic binder may be latex or the like, and the flocculant may be any of known ones.

Preferably, in the production method of the present invention, an inorganic binder is added during slurry preparation. When the first inorganic fiber molding and the second inorganic fiber molding each contain an inorganic binder, an inorganic binder may not be additionally added in the papermaking step. Even when an inorganic binder is additionally added, the amount thereof may be smaller than the amount of the initial inorganic binder. Even when the first inorganic fiber molding and the second inorganic fiber molding each contain an inorganic binder, an inorganic binder in the same amount as described above may be added to the slurry.

When the first inorganic fiber molding and the second inorganic fiber molding contain an inorganic binder, the material of the inorganic binder to be added in the papermaking step may be the same as or different from the material of the inorganic binder contained in the first inorganic fiber molding and the second inorganic fiber molding.

The formation of an inorganic fiber mat by papermaking using a slurry can be performed, for example, as follows.

The prepared slurry is poured into a mold of a desired shape, a raw material sheet is molded, and water is removed from the sheet. Usually, the molding machine is equipped with a filtration wire mesh (mesh size: 30 mesh) at its bottom. Through the filtration wire mesh, water in the slurry poured into the molding machine is discharged. Use of such a molding machine enables molding of a raw material sheet and removal of water from the raw material sheet at the same time. If necessary, water may be forcibly sucked from the bottom of the molding machine through the filtration wire mesh using a suction pump, a vacuum pump, or the like.

Next, the obtained raw material sheet is taken out from the molding machine. The raw material sheet is compressed using a press or the like so that the thickness thereof is reduced to about 0.3 to 0.5 times the original thickness, while the raw material sheet is heated and dried at a temperature of 150° C. to 210° C. for five minutes to one hour, for example. Thereby, an inorganic fiber mat can be obtained.

The inorganic fiber mat obtained by the production method of the present invention may be cut into pieces each having a desired shape, which may be used as holding sealing materials for an exhaust gas purification apparatus.

The present invention encompasses the inorganic fiber mat obtained by the production method of the present invention. The inorganic fiber mat of the present invention is formed by papermaking using a slurry containing inorganic fibers obtained by defibrating a first inorganic fiber molding derived from a needle-punched mat and a second inorganic fiber molding derived from a papermaking mat. The density and thickness of such an inorganic fiber mat can be easily controlled. Thus, the inorganic fiber mat has both resilience and wrapability.

Herein, the following matters are disclosed.

The present disclosure (1) encompasses a method of producing an inorganic fiber mat, the method including: a preparing step of preparing a first inorganic fiber molding derived from a needle-punched mat and a second inorganic fiber molding derived from a papermaking mat; a defibrating step of defibrating the first inorganic fiber molding and the second inorganic fiber molding to obtain defibrated inorganic fibers; and a papermaking step of forming the inorganic fiber mat by papermaking using a slurry containing the defibrated inorganic fibers.

The present disclosure (2) encompasses the method of producing an inorganic fiber mat according to the present disclosure (1), wherein at least one of the first inorganic fiber molding or the second inorganic fiber molding is cut.

The present disclosure (3) encompasses the method of producing an inorganic fiber mat according to the present disclosure (1) or (2), wherein at least one of the first inorganic fiber molding or the second inorganic fiber molding includes offcuts of different shapes, and at least one of the offcuts has irregularities.

The present disclosure (4) encompasses the method of producing an inorganic fiber mat according to any one of the present disclosures (1) to (3), wherein the first inorganic fiber molding and the second inorganic fiber molding are each an inorganic fiber molding sheet having an area of 1 $cm^2$ or more.

The present disclosure (5) encompasses the method of producing an inorganic fiber mat according to any one of the present disclosures (1) to (4), wherein the second inorganic fiber molding contains an inorganic binder.

The present disclosure (6) encompasses the method of producing an inorganic fiber mat according to any one of the present disclosures (1) to (5), wherein an average fiber length of inorganic fibers constituting the needle-punched mat is longer than an average fiber length of inorganic fibers constituting the papermaking mat.

The present disclosure (7) encompasses the method of producing an inorganic fiber mat according to any one of the present disclosures (1) to (6), wherein a proportion of the first inorganic fiber molding is 5 to 95% by weight based on a total weight of the first inorganic fiber molding and the second inorganic fiber molding.

The present disclosure (8) encompasses the method of producing an inorganic fiber mat according to any one of the present disclosures (1) to (7), wherein the defibrating step includes only wet defibration.

The present disclosure (9) encompasses the method of producing an inorganic fiber mat according to any one of the present disclosures (1) to (8), wherein the needle-punched mat is formed by folding a thin layer sheet of an inorganic fiber precursor multiple times into a layered body with a predetermined width, and firing the layered body.

The present disclosure (10) encompasses the method of producing an inorganic fiber mat according to any one of the present disclosures (1) to (9), wherein the first inorganic fiber molding and the second inorganic fiber molding are each cut before the defibrating step.

The present disclosure (11) encompasses the method of producing an inorganic fiber mat according to any one of the present disclosures (1) to (10), wherein the slurry further contains new inorganic fibers, and the new inorganic fibers and the defibrated inorganic fibers have the same composition and are alumina-silica fibers containing 60 to 80% by weight of $Al_2O_3$.

The present disclosure (12) encompasses an inorganic fiber mat produced by a method of producing an inorganic fiber mat, the method including: a preparing step of preparing a first inorganic fiber molding derived from a needle-punched mat and a second inorganic fiber molding derived from a papermaking mat; a defibrating step of defibrating the first inorganic fiber molding and the second inorganic fiber molding to obtain defibrated inorganic fibers; and a papermaking step of forming the inorganic fiber mat by papermaking using a slurry containing the defibrated inorganic fibers.

The present disclosure (13) encompasses the inorganic fiber mat according to the present disclosure (12), wherein at least one of the first inorganic fiber molding or the second inorganic fiber molding is cut.

The present disclosure (14) encompasses the inorganic fiber mat according to the present disclosure (12) or (13), wherein at least one of the first inorganic fiber molding or the second inorganic fiber molding includes offcuts of different shapes, and at least one of the offcuts has irregularities.

The present disclosure (15) encompasses the inorganic fiber mat according to any one of the present disclosures (12) to (14), wherein the first inorganic fiber molding and the second inorganic fiber molding are each an inorganic fiber molding sheet having an area of 1 $cm^2$ or more.

The present disclosure (16) encompasses the inorganic fiber mat according to any one of the present disclosures (12) to (15), wherein the second inorganic fiber molding contains an inorganic binder.

The present disclosure (17) encompasses the inorganic fiber mat according to any one of the present disclosures (12) to (16), wherein an average fiber length of inorganic fibers constituting the needle-punched mat is longer than an average fiber length of inorganic fibers constituting the papermaking mat.

The present disclosure (18) encompasses the inorganic fiber mat according to any one of the present disclosures (12) to (17), wherein a proportion of the first inorganic fiber molding is 5 to 95% by weight based on a total weight of the first inorganic fiber molding and the second inorganic fiber molding.

The present disclosure (19) encompasses the inorganic fiber mat according to any one of the present disclosures (12) to (18), wherein the defibrating step includes only wet defibration.

The present disclosure (20) encompasses the inorganic fiber mat according to any one of the present disclosures (12) to (19), wherein the needle-punched mat is formed by folding a thin layer sheet of an inorganic fiber precursor multiple times into a layered body with a predetermined width, and firing the layered body.

The present disclosure (21) encompasses the inorganic fiber mat according to any one of the present disclosures (12) to (20), wherein the first inorganic fiber molding and the second inorganic fiber molding are each cut before the defibrating step.

The present disclosure (22) encompasses the method of producing an inorganic fiber mat according to any one of the present disclosures (12) to (21), wherein the slurry further contains new inorganic fibers, and the new inorganic fibers and the defibrated inorganic fibers have the same composition and are alumina-silica fibers containing 60 to 80% by weight of $Al_2O_3$.

EXAMPLES

An example that more specifically discloses the present invention is described below. The present invention is not limited to the following example.

The following describes: production of a papermaking mat which is formed by subjecting to papermaking inorganic fiber materials obtained by defibrating a needle-punched mat and a papermaking mat; and evaluation of the bulk density in water, thickness, and wrapability (formability).

As shown in Table 1, in Comparative Example 1, only a first inorganic fiber molding derived from a needle-punched mat was used, and in Example 1, a first inorganic fiber molding derived from a needle-punched mat and a second inorganic fiber molding derived from a papermaking mat were used (first inorganic fiber molding derived from needle-punched mat:second inorganic fiber molding derived from papermaking mat=70:30 (weight ratio)). For the first inorganic fiber molding derived from a needle-punched mat, a mat made of alumina-silica fibers having a ratio of $Al_2O_3:SiO_2=72:28$ (weight ratio) and having a density of needle marks of 21 per $cm^2$ was prepared. For the second inorganic fiber molding derived from a papermaking mat, a papermaking mat made of alumina-silica fibers with a ratio of $Al_2O_3:SiO_2=72:28$ (weight ratio) was prepared.

First, the first inorganic fiber molding and the second inorganic fiber molding were each fired at 800° C. for one hour to thermally decompose the organic binder and allowed to stand until the temperature decreased to room temperature.

In Comparative Example 1, 40.0 g of the first inorganic fiber molding was taken out and placed in 1.6 L of water. The contents were stirred at a rotation speed of 750 rpm for 10 minutes using a stirrer (product name: SMT-101, manufacturer: ASONE) to perform defibration. Thus, a slurry of inorganic fibers was prepared.

Subsequently, an organic binder was added to the slurry in an amount of 0.5 to 10 parts by weight per 100 parts by weight of the inorganic fibers, and an inorganic binder was added to the slurry in an amount of 0.5 to 3.0 parts by weight per 100 parts by weight of the inorganic fibers.

Subsequently, the slurry was poured into a mold equipped with a mesh for filtering at the bottom, and the solvent in the slurry is removed, whereby an inorganic fiber aggregate in the form of a sheet was obtained. Thereafter, water was removed from the inorganic fiber aggregate. The resulting inorganic fiber aggregate was pressed using a common press dryer to a thickness of 9.5 mm, while it was dried at 150° C. to 210° C. for 5 minutes to 1.0 hours. Thereby, a papermaking mat of Comparative Example 1 was produced, which had a fiber surface specific gravity of 1500 g/m². The slurry in Comparative Example 1 had a bulk density in water of 0.01360 g/cm³ and the mat of Comparative Example 1 had a thickness of 10.8 mm.

A papermaking mat of Example 1 was produced as in Comparative Example 1, except that 28.0 g of the first inorganic fiber molding and 12.0 g of the second inorganic fiber molding were used. The mat had a fiber surface specific gravity of 1500 g/m². The slurry in Example 1 had a bulk density in water of 0.01489 g/cm³ and the mat of Example 1 had a thickness of 9.9 mm.

Specimens were prepared by cutting each of the mats of Comparative Example 1 and Example 1 into a rectangular shape. Each specimen had a longitudinal length of 350 mm and a transverse length of 30 mm. The specimen was wrapped around a cylindrical body with a diameter of 100 mm, and visually observed whether or not cracks occurred in the specimen. The wrapability was evaluated as follows: a non-cracked specimen was rated as good; and a cracked specimen was rated as poor.

TABLE 1

|  | Comparative Example 1 | Example 1 |
| --- | --- | --- |
| Proportion of first inorganic fiber molding derived from needle-punched mat | 100 | 70 |
| Proportion of second inorganic fiber molding derived from mat produced by papermaking | 0 | 30 |
| Bulk density in water (g/cm³) | 0.01360 | 0.01489 |
| Fiber surface specific gravity (g/m²) | 1500 | 1500 |
| Thickness (mm) | 10.8 | 9.9 |
| Wrapability | Poor | Good |

As shown in Table 1, the mat of Example 1 in which the first inorganic fiber molding and the second inorganic fiber molding were used as materials had a smaller thickness than the mat of Comparative Example 1 in which only the first inorganic fiber molding was used, when these mats had been pressed under the same conditions. A mat produced using only the first inorganic fiber molding derived from a needle-punched mat as a material tends to be thick. Yet, when a papermaking mat is produced, under the same conditions, using both the first inorganic fiber molding derived from a needle-punched mat and the second inorganic fiber molding derived from a papermaking mat as materials, the mat having the same fiber surface specific gravity can have a smaller thickness. This is because the inorganic fibers derived from a papermaking mat enter the gaps between the inorganic fibers or between the fiber bundles derived from a needle-punched mat to provide a dense mat.

These results demonstrate that the density and thickness of the mat can be adjusted by varying the proportions of the first inorganic fiber molding and the second inorganic fiber molding.

These results also demonstrate that the mat of Example 1 is thinner than the mat of Comparative Example 1, and is less likely to break even when wrapped around a cylindrical body. These results also demonstrate that the production method of the present invention can provide an inorganic fiber mat with excellent wrapability.

REFERENCE SIGNS LIST 10 first inorganic fiber molding derived from needle-punched mat
11 inorganic fiber derived from needle-punched mat
11a short inorganic fiber derived from needle-punched mat
12 inorganic fiber at intertwined portion
12a short inorganic fiber derived from intertwined portion of needle-punched mat
20 second inorganic fiber molding derived from papermaking mat
21 inorganic fiber derived from papermaking mat
21a short inorganic fiber derived from papermaking mat
31 inorganic fiber mat material
31A needle-punched mat before firing
31a outer edge
32 holding sealing material forming portion
33 offcut
34 holding sealing material
35 thin layer sheet of inorganic fiber precursor
36 folded portion
100, 101, 102 inorganic fiber mat

The invention claimed is:

1. A method of producing an inorganic fiber mat, the method comprising:
a preparing step of preparing a first inorganic fiber molding derived from a needle-punched mat and a second inorganic fiber molding derived from a papermaking mat;
a defibrating step of defibrating the first inorganic fiber molding and the second inorganic fiber molding to obtain defibrated inorganic fibers; and
a papermaking step of forming the inorganic fiber mat by papermaking using a slurry containing the defibrated inorganic fibers.

2. The method of producing an inorganic fiber mat according to claim 1,
wherein at least one of the first inorganic fiber molding or the second inorganic fiber molding is cut.

3. The method of producing an inorganic fiber mat according to claim 1,
wherein at least one of the first inorganic fiber molding or the second inorganic fiber molding includes offcuts of different shapes, and at least one of the offcuts has irregularities.

4. The method of producing an inorganic fiber mat according to claim 1,
wherein the first inorganic fiber molding and the second inorganic fiber molding are each an inorganic fiber molding sheet having an area of 1 cm$^2$ or more.

5. The method of producing an inorganic fiber mat according to claim 1,
wherein the second inorganic fiber molding contains an inorganic binder.

6. The method of producing an inorganic fiber mat according to claim 1,
wherein an average fiber length of inorganic fibers constituting the needle-punched mat is longer than an average fiber length of inorganic fibers constituting the papermaking mat.

7. The method of producing an inorganic fiber mat according to claim 1,
wherein a proportion of the first inorganic fiber molding is 5 to 95% by weight based on a total weight of the first inorganic fiber molding and the second inorganic fiber molding.

8. The method of producing an inorganic fiber mat according to claim 1,
wherein the defibrating step comprises only wet defibration.

9. The method of producing an inorganic fiber mat according to claim 1,
wherein the needle-punched mat is formed by folding a thin layer sheet of an inorganic fiber precursor multiple times into a layered body with a predetermined width, and firing the layered body.

10. The method of producing an inorganic fiber mat according to claim 1,
wherein the first inorganic fiber molding and the second inorganic fiber molding are each cut before the defibrating step.

11. The method of producing an inorganic fiber mat according to claim 1,
wherein the slurry further contains new inorganic fibers, and
the new inorganic fibers and the defibrated inorganic fibers have the same composition and are alumina-silica fibers containing 60 to 80% by weight of $Al_2O_3$.

* * * * *